F. J. LINDENTHALER & J. PROTZ.
ROUTE INDICATOR FOR AUTOMOBILES.
APPLICATION FILED NOV. 30, 1907.
Patented Mar. 23, 1909.
2 SHEETS—SHEET 1.
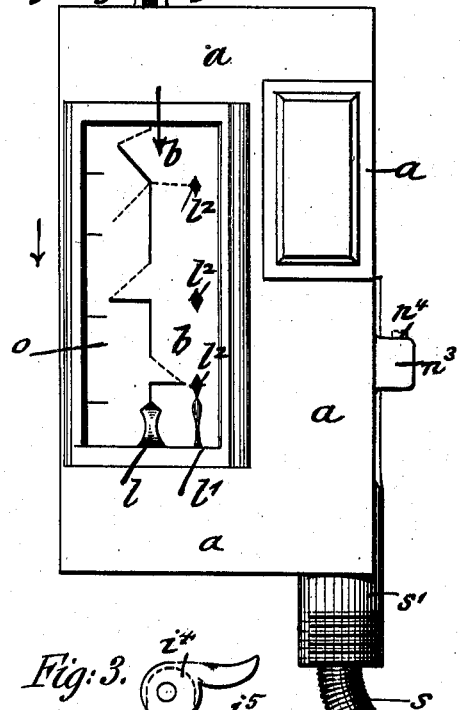
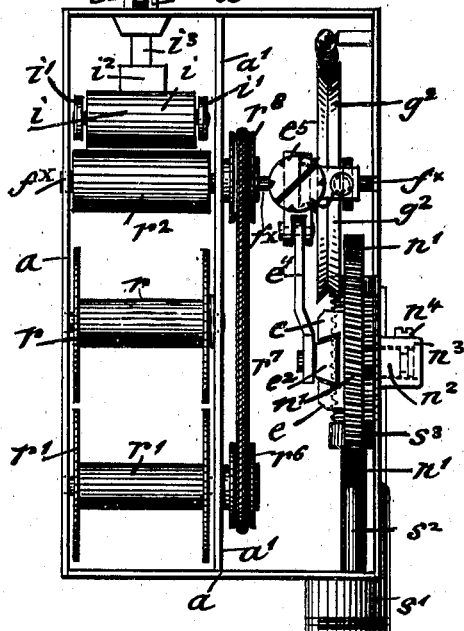
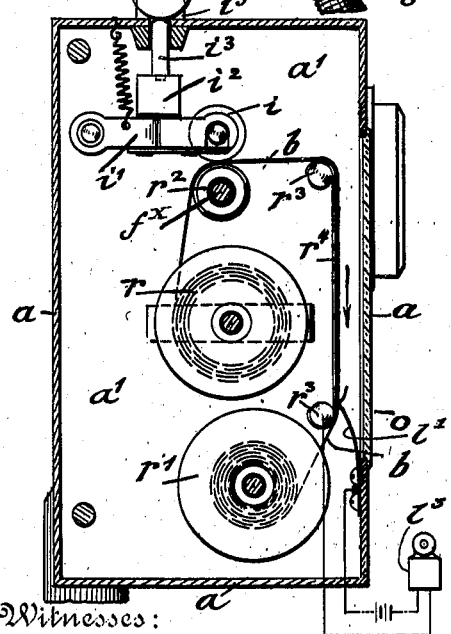
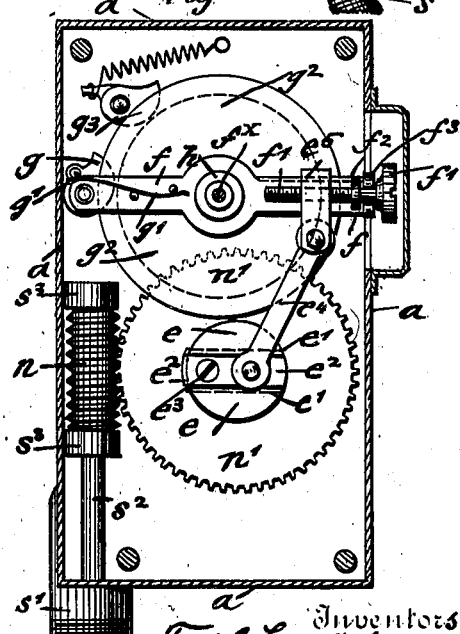

F. J. LINDENTHALER & J. PROTZ.
ROUTE INDICATOR FOR AUTOMOBILES.
APPLICATION FILED NOV. 30, 1907.
915,976.
Patented Mar. 23, 1909.
2 SHEETS—SHEET 2.
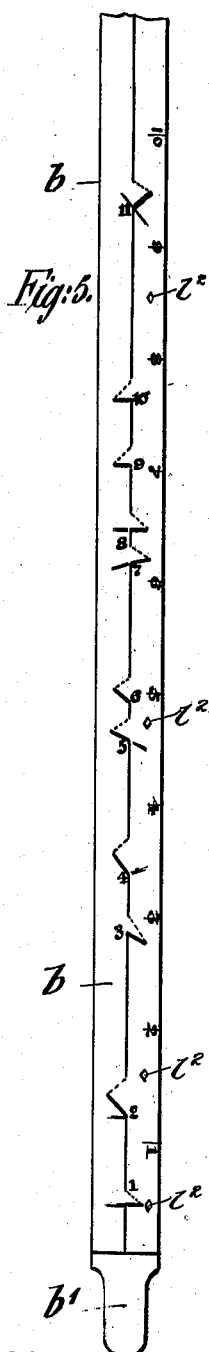
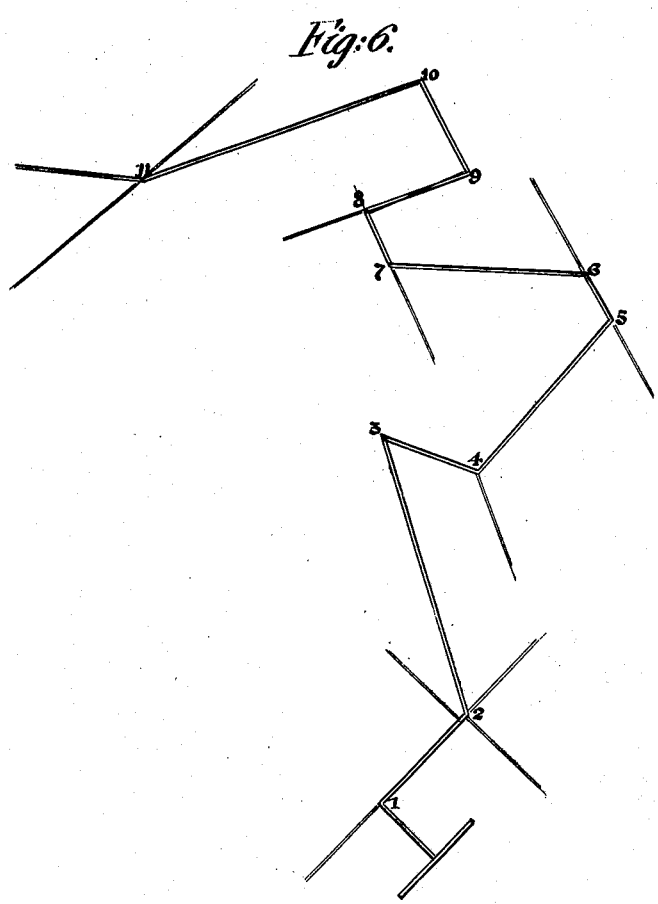

UNITED STATES PATENT OFFICE.

FRANK J. LINDENTHALER, OF GLENS FALLS, AND JOHN PROTZ, OF NEW YORK, N. Y.

ROUTE-INDICATOR FOR AUTOMOBILES.

No. 915,976.　　　　Specification of Letters Patent.　　Patented March 23, 1909.

Application filed November 30, 1907. Serial No. 404,545.

*To all whom it may concern:*

Be it known that we, FRANK J. LINDENTHALER, a citizen of the United States of America, residing at Glens Falls, in the county of Warren and State of New York, and JOHN PROTZ, a citizen of the Empire of Austria-Hungary, residing in New York, borough of Manhattan, county and State of New York, have invented certain new and useful Improvements in Route-Indicators for Automobiles, of which the following is a specification.

This invention relates to an attachment for automobiles to which we have given the name of "route-indicator" and which is driven by a flexible shaft connecting it with the front axle or front wheel of an automobile, for the purpose of forming a guide device by which the route to be traveled is indicated to the chauffeur, so as to prevent thereby to a certain extent the necessity of making inquiries for the road to be taken, and also for facilitating the work of a chauffeur not conversant with the country and rendering thereby the owner of an automobile to some extent independent of the chauffeur; and for this purpose the invention consists in the novel features of construction which will be fully described hereinafter and finally pointed out in the claims.

In the accompanying drawings, Figure 1 represents a front-view of our improved route-indicator for automobiles, Fig. 2 is a front-view, with the front plate removed so as to show the interior construction, Fig. 3 is a side-elevation, partly in section, of the indicator with the side plate removed, Fig. 4 shows the opposite side of the indicator, the opposite side plate being removed, Fig. 5 is a plan-view of the route-indicating strip, and Fig. 6 is a diagram of the route as represented on the route-indicating strip, the latter serving for the purpose of illustrating the route to be taken.

Similar letters of reference indicate corresponding parts throughout the several figures.

Referring to the drawings, *a* represents a rectangular metallic casing, which is of approximately square shape in horizontal cross-section, and which is provided in its front wall with an oblong glass-covered opening *o*. The glass cover may be applied to the casing in any suitable manner, either hinged or otherwise. Through the opening *o* is seen a route-indicating strip *b* on which a certain route, which is to be traveled by the automobile, is graphically represented. The route-indicating strip *b* is provided at its outer or starting end with a tapering tongue $b^1$ which is attached to the shaft of the winding-up reel $r^1$ in any suitable manner, while the main-portion is wound up on a reel *r* and inserted with the same into the casing of the route-indicator.

The route-indicating strip is provided at one edge with mile-notations and at the center with heavy lines of different lengths indicating the direction and distances of the route to be traveled, while the intersecting cross-roads are indicated by intersecting lines inclined toward the right or left as the intersecting roads lie toward the main road, said intersections being numbered as indicated in Fig. 5, the distances between the intersections being taken from reliable maps so as to correspond with the mile-indications marked along one side of the strip. Fig. 6 shows how the roads are actually laid out, and Fig. 5 shows how the indications are transferred to the strip, which, of course, is straight and does not conform with the actual curves of the route.

At the lower edge of the glass cover of the opening *o* is arranged an index-hand *l* in line with the route represented on the route-indicating strip *b*, and a contact-spring $b^3$ which passes over holes $l^2$ in the strip *b*, punched at the more important intersections, said contact-spring closing an electric circuit that rings a bell $l^3$, as shown diagrammatically in Fig. 3 so as to draw the attention of the chauffeur to the fact that an important road-intersection is reached.

The casing of the route-indicator is divided by a transverse partition $a^1$ into two chambers, a reel-chamber near the front opening *o* and a second chamber sidewise of the same. In the reel-chamber are located the reels $r, r^1$ for the route-indicating strip, and above the reels the mechanism for interrupting the motion of the strip, while in the other chamber is located the mechanism by which motion is transmitted to the strip.

At the middle part of the reel-chamber formed at the left-hand side of the casing is inserted the reel *r* on which the route-indicating strip is wound up. One end of the strip *b* is attached to the shaft of the reel *r*, while the outer-end is passed over a driving-roller $r^2$, over round transverse guide-rods $r^3$ and over a stationary sheet-metal bridge $r^4$ arranged between the rods $r^3$ and close to the front-opening of the casing, so that the strip will readily show in the opening of the same. The outer end of the strip $b$ is then attached to the shaft of the winding-up reel $r^1$, which is located in the lower part of the reel-chamber. The route-indicating strip is moved forward by the driving-roller $r^2$ in connection with a presser-roller $i$, which is mounted on a spring-actuated lever $i^1$, and which is pressed on the strip by a suitable mechanism which will be described hereinafter. On the shaft of the winding-up reel $r^1$ is arranged a pulley $r^6$ to which motion is transmitted by an elastic belt $r^7$ from a pulley $r^8$, of the same size as pulley $r^6$, on the shaft of the driving-roller $r^2$, as shown in Fig. 3, so that rotary motion is transmitted from the driving-roller at the speed of the same to the lower winding-up reel and the strip thereby unwound from one reel and wound up on the other reel, according to the speed of the machine. When the route is completed and a new route is to be taken, the reel with the strip wound up thereon is taken out of the casing by removing the side-plate of the latter, and a reel with another route-indicating strip placed in position in the casing to serve as a guide for the new route to be taken.

The mechanism by which motion is transmitted to the route-indicating strip and its reels, is driven by a flexible shaft $s$, which is provided in the usual manner with a small pulley or driving-disk that is placed in frictional contact with the front axle or with the tire of one of the front wheels, and by which rotary motion is transmitted in the same manner as to speedometers and other attachments for automobiles. The flexible shaft $s$ is passed through a tubular nipple $s^1$ at the lower part of the casing and connected with a worm-spindle $s^2$. The casing is screwed to a bracket on the dashboard or other suitable point in front of the seat of the chauffeur. The inner end of the worm-spindle $s^2$ is supported in suitable bearings $s^3$ at the interior of the casing $a$ and provided with a worm $n$ between the bearings $s^3$ and placed in engagement with a worm-wheel $n^1$ which turns by a stud-shaft $n^2$ in a suitable bearing $n^3$ of the casing, as shown in Fig. 2, the grooved end of the stud-shaft being retained by a set-screw $n^4$ which projects into the groove at the end of the shaft $n^2$. To the inner surface of the worm-wheel $n^1$ is applied a disk $e$ which is provided with a dove-tailed recess $e^1$ in which is guided a cross-piece $e^2$ which is clamped in position after adjustment in the recess by a set-screw $e^3$. To the cross-piece $e^2$ is pivoted a connecting-rod $e^4$, the upper end of which is pivoted to the lower end of an inverted U-shaped piece $e^5$ which is located on an oscillating lever $f$ that is centrally pivoted to a fulcrum-shaft $f^\times$ attached to the wall of the casing. One end of the lever $f$ is provided with an adjusting-screw $f^1$ that engages a threaded socket on the U-shaped piece $e^5$, the head of the adjusting-screw being provided with indicating-marks, its shank being retained by a collar $f^2$ in a recessed lug $f^3$ of the lever $f$, as shown in Fig. 4. To the opposite end of the lever $f$ is pivoted an eccentric pawl $g$ which is pressed by a flat spring $g^1$ into the grooved circumference of a drive-wheel $g^2$ mounted on the shaft $f^\times$ so as to impart a step-by-step rotary motion to the same by the oscillating motion of the lever $f$. On the return motion of the oscillating lever $f$ the drive-wheel $g^2$ is held by a spring-actuated check-pawl $g^3$. The shaft $f^\times$ turns in bearings of the partition $a^1$ and side-wall of the casing and serves to support the driving-roller $r^2$ and the pulley $r^8$. By the oscillating motion imparted to the lever $f$ and the friction-pawl $g$ intermittent rotary motion is imparted to the drive-wheel $g^2$ and the driving-roller $r^2$, and by the latter, belt $r^7$ and pulley $r^6$ to the winding-up reel $r^1$ and the route-indicating strip $b$, as before described. As the roll on the winding-up reel increases in diameter, it is apparent that the belt $r^7$ must slip to a greater or less extent on the pulley of this reel, depending on the size of the roll.

The speed of the motion-transmitting mechanism can be adjusted in proportion to the speed of the automobile by adjusting the cross-piece $e^2$ in its guideway $e^1$, which is necessary, as otherwise the motion of the route-indicating strip would not correspond with the motion of the vehicle. This is accomplished by setting the adjustable cross-piece $e^2$ nearer to or farther away from the axis of the worm-wheel $n^1$, as will be readily understood.

The mechanism which holds the presser-roller $i$ in contact with the strip consists of a presser-block $i^2$ that forms contact with the forked lever $i^1$. The shank $i^3$ of the block $i^2$ passes through a perforated boss on the top-plate of the casing $a$ to the outside of the same, where it is engaged by a cam-lever $i^4$, the pivot of which turns in perforated ears $i^5$ located on the top-plate of the casing $a$. When the cam is pressed down on the shank of the presser-block $i^2$, the latter presses on the strip $b$ and holds it in contact with the driving-roller $r^2$ so as to produce the forward motion of the strip. When the cam-lever $i^4$ is raised, the cam is released from the shank of the block $i^2$ and the spring which is connected with the lever $i^1$ lifts the presser-roller $i$ away from the strip and interrupts thereby the motion of the same. This has to be done when the automobile arrives at a stopping place and has to move forward and backward, or make other motions which have no connection with the route and distance to be traveled. When the automobile proceeds on its course, then the cam-lever is lowered again so that the proper motion of the route-indicating strip is resumed. The stopping and starting device is also used when the automobile is going into a garage, so as to disengage the strip from the motion-transmitting mechanism and remove the wound-up reel from the indicator, while a new reel is put in when going out for another route.

When the route-indicating device is properly adjusted on the automobile and connected by the flexible shaft with the axle or tire and the route-indicating strip placed in proper position in the reel-chamber, it is so adjusted that it moves at the rate of two inches to the mile, corresponding exactly to the number of miles run by the machine. Consequently, if it is a half mile from the starting point to the next road-crossing, the strip will travel one inch and then indicate the intersecting road where the machine has to be moved to the right or left. By the mile-indications along one side of the strip, the miles that have been traveled are indicated, while besides the road-crossings also the different hotels and other places of interest on the route can be marked on the strip.

When it is not desired to publish a special route-strip for the use of chauffeurs, the owner of the automobile can also make a record of his own by taking a blank-strip of paper, placing it in the machine, and marking the starting point and then the intersecting points at the right or left, and continuing till the next corner is reached, and then marking it on the strip and continue marking the route on the strip up to the end of the route. When the same route is to be traveled over again, the strip is replaced in the machine, and then by watching the strip the route can be covered in the same manner without difficulty, whether the chauffeur has been over it or not, so that it is not absolutely necessary to have a chauffeur conversant with the different routes, while the changing of a chauffeur is less troublesome than heretofore. For specially favored routes covering greater distances, the strips may be published for the use of automobilists and sold at a small price, whereby the traveling by high-speed automobiles is facilitated and rendered easier than heretofore.

The advantages of our improved route-indicator are, first, that an automobilist can travel over comparatively unknown roads without the necessity of making inquiries on the road or mistakes; second, that it facilitates the change of chauffeurs as any chauffeur can readily drive the automobile over routes even if they are not specially known to him, whereby the owners of automobiles are rendered more independent of the chauffeurs and enabled to control the route taken and ascertain the mileage made by the machine.

Having thus described our invention, we claim as new and desire to secure by Letters Patent:

1. In a route-indicator for automobiles, the combination, with the driving-roller and the shaft of said roller, of a grooved drive-wheel mounted on said shaft, an oscillating lever mounted on said shaft and carrying at one end a pawl to coact with the grooved circumference of said drive-wheel, a worm-wheel, a worm for driving said worm-wheel, and a connecting-rod connected with said oscillating lever at the end opposite said pawl and adjustably connected with said worm-wheel.

2. In a route-indicator for automobiles, the combination, with the driving-roller and the indicator-strip, of a pivoted spring-actuated lever, a presser-roller carried by said lever, a vertically-guided block to depress said lever so that the presser-roller coöperates with the driving-roller in feeding the indicator-strip, and a cam by which said block is depressed.

In testimony, that we claim the foregoing as our invention, we have signed our names in presence of two subscribing witnesses.

FRANK J. LINDENTHALER.
JOHN PROTZ.

Witnesses:
PAUL GOEPEL,
HENRY J. SUHRBIER.